United States Patent [19]

Tatsuhiko

[11] Patent Number: 4,866,381
[45] Date of Patent: Sep. 12, 1989

[54] PLURAL MAGNET DEVICE FOR MAGNETICALLY DETECTING ROTATION ANGLE OF A ROTARY BODY

[75] Inventor: Abe Tatsuhiko, Saitama, Japan
[73] Assignee: Diesel Kiki Co., Ltd., Tokyo, Japan
[21] Appl. No.: 190,475
[22] Filed: May 4, 1988

Related U.S. Application Data

[63] Continuation-in-part of Ser. No. 34,764, Apr. 6, 1987, abandoned.

[30] Foreign Application Priority Data

Apr. 8, 1986 [JP] Japan ................................ 61-80865

[51] Int. Cl.⁴ ........................ G01B 7/30; F02P 7/067
[52] U.S. Cl. ..................................... 324/208; 123/617
[58] Field of Search ............... 324/160, 163, 166, 167, 324/173, 174, 207, 208, 391, 392; 310/156, 168; 341/15; 123/414, 617

[56] References Cited

U.S. PATENT DOCUMENTS

4,551,676 11/1985 Amemiya et al. ............... 324/174 X
4,695,795 9/1987 Nakamizo et al. .................. 324/208
4,746,862 5/1988 Ueki ................................... 324/174 X Primary Examiner—Gerard R. Strecker
Attorney, Agent, or Firm—Koda and Androlia

[57] ABSTRACT

A rotation angle detector has magnets of different polarities arranged with one polarity alternately with the other polarity on the circumferential surface of a rotary body, wherein a plurality of magnets on the portions of the circumferential surface having a width which is different from that of a plurality of magnets on the remaining portions. A single rotation angle sensor arranged to oppose the circumferential surface of the rotary body scans the magnets when the rotary body is rotated, thereby outputting a reference signal and a rotation angle signal. Mutually adjacent magnets which differ in width are so formed that whichever is scanned earlier by the rotation angle sensor will have a width narrowed by a predetermined amount if it is wider than the other or a width widened by the predetermined amount if it is narrower than the other. Irrespective of the altered width, the sum of the magnetized areas of these mutually adjacent magnets is held constant. This arrangement corrects a magnetic imbalance at locations where the width of one magnet differs from that of its neighbor, thereby enabling an ideal output waveform to be obtained from the rotation angle sensor.

1 Claim, 4 Drawing Sheets

PLURAL MAGNET DEVICE FOR MAGNETICALLY DETECTING ROTATION ANGLE OF A ROTARY BODY

This is a continuation-in-part of application Ser. No. 034,764, filed Apr. 6, 1987, now abandoned.

BACKGROUND OF THE INVENTION

1. Field of the Invention

This invention relates to a device for magnetically detecting an angle of rotation of a rotary body. More particularly, the invention relates to a detection device well-suited for obtaining such basic information as, e.g. the ignition timing of an engine and is of the type which includes a plurality of magnets of different polarities arranged with one polarity alternately with the other polarity on the circumferential surface of a rotary body that rotates together with an engine crankshaft, and a magnetically sensitive element arranged to oppose these magnets, wherein the magnets on the rotary body are scanned by the magnetically sensitive element when the body is rotated, thereby an angle of rotation of the rotary body is detected.

2. Description of Prior Art

Electronic control has come to be widely employed in automotive vehicles in recent years. Since an item of basic information necessary for such electronic control is the rotation angle of the engine crankshaft, means are provided for detecting the rotation angle. One example of such a rotation angle detector includes magnets of different polarities arranged with one polarity alternately with the other polarity on the circumferential surface of a rotary body, and a rotation angle sensor spaced a predetermined distance from the circumferential surface of the rotary body. The magnets, which move together with the rotary body when the body is rotated, are scanned by the sensor, which produces an output signal indicative of the angle of rotation.

A specific example of such a rotation angle detector is disclosed in the specification of Japanese Patent Application Laid-Open (KOKAI) No. 57-46117. One type of rotation angle detector 11 suggested by this reference has the structure shown in FIGS. 4 and 5.

The rotation angle detector 11 includes, for example, a cylindrical rotary body 13 mounted on and integrally with a rotary shaft 12 that rotates together with and engine crankshaft. Magnets $r_1, r_3, r_5, r_7 \ldots$ of N polarity and magnets $r_2, r_4, r_6, r_8 \ldots$ of S polarity are arranged on the circumferential surface of the rotary body 13 alternately of N and S polarities. The detector 11 further includes a rotation angle sensor 14, which comprises an element sensitive to the magnetic fields produced by the aforementioned magnets and which is arranged at a position spaced a predetermined distance from the circumferential surface of the rotary body 13.

The magnets $r_3, r_4, r_5, r_6$, of the magnets $r_1$–$r_8$ on the portions of the circumferential surface of rotary body 13 are formed to be uniformly narrow in width (width being a length along the circumferential direction of the rotary body), while the remaining magnets $r_1, r_2, r_7, r_8$ are formed to be comparatively wide in width (width being as defined above). The narrow magnets $r_3$ through $r_6$ are used to produce a reference signal, whereas the wide magnets $r_1, r_2, r_7, r_8$ are employed to produce a rotation angle signal. For example, the width of each of the magnets $r_3$ through $r_6$ corresponds to an angle of $\theta$ with respect to the center O of rotation, and the width of each of the magnets $r_1, r_2, r_7, r_8$ corresponds to an angle of $2\theta$.

With the rotation angle detector 11, the magnets $r_1$ through $r_8$ disposed on the circumferential surface of the rotary body 13 are scanned by the rotation angle sensor 14 as the rotary body 13 rotates, and the rotation angle sensor 14 produces electric signals corresponding to each width ($\theta$, $2\theta$) of the magnets $r_1$ through $r_8$. The output signal of the sensor 14 contains rotation angle signals corresponding to the wide magnets and reference signals corresponding to the narrow magnets, as shown in FIG. 6(c). As shown in FIG. 6(d), this output signal is shaped into a pulsed waveform by a waveform shaping circuit. The resulting pulses are used respectively as signals representing, for example, and angle of the crankshaft and as reference signals in controlling the ignition timing of an engine.

An advantage of the rotation angle detector 11 is that both the rotation angle signal and reference signal can be detected by the single rotation angle sensor 14. However, the inventors have discovered that the rotation angle detector of this type exhibits a magnetic imbalance at the boundaries between adjacent magnets of different widths arranged on the circumferential surface of the rotary body. The problem caused by this magnetic imbalance is that and angular error is produced in the shaped output waveform.

More specifically, if the magnets are scanned by using a Hall device as the rotation angle sensor 14, it is preferable that the ideal sensor output corresponding to the magnets $r_1$ through $r_8$ should appear as shown in FIG. 6(a). However, the actual sensor output takes the form shown in FIG. 6(c), in which errors are produced at points A and B where there is a change in magnet width. Whereas the ideal waveform following shaping should appear as depicted in FIG. 6(b), the actual shaped waveform contains angular errors, as illustrated in FIG. 6(d). It should be noted that the actual sensor output incurs a delay at the slice level at point A, where magnet width changes from wide to narrow, as a result of which the same delay appears in the actual shaped waveform. The phenomenon that occurs at point B, where magnet width changes from narrow to wide, is the reverse, thereby to raise the problem of failure to provide a precise engine control.

In view of the aforementioned problems in the prior art rotation angle detector, the present invention has been made to solve the problems effectively.

SUMMARY OF THE INVENTION

Accordingly, an object of the present invention is to provide a rotation angle detector in which there is no magnetic imbalance at locations where magnet width changes and, hence, no angular error in shaped output waveform, while maintaining the advantage of obtaining both the rotation angle signal and the reference signal by means of a single sensor.

According to the present invention, the foregoing object is attained by providing a rotation angle detector which comprises a rotary body, magnets of different polarities arranged with one polarity alternately with the other polarity on the circumferential surface of the rotary body, and a rotation angle sensor comprising a magnetically sensitive element arranged to oppose the magnets on the circumferential surface of the rotary body so as to scan the magnets when the rotary body is rotated. A plurality of magnets for producing a reference signal occupy portions of the circumferential surface of the rotary body and have a width different fro that of the magnets occupying the remaining portions of the circumferential surface. Of mutually adjacent magnets which differ in width, if the magnet which is scanned earlier by the rotation angle sensor has a wider width than that of the other magnet, the width of that magnet is reduced by a predetermined amount. Conversely, if the width of that magnet is narrower, the width is increased by a predetermined amount, so as to have the sum of the areas of the adjacent magnets in a constant value.

In accordance with rotation angle detector of this invention, flux density changes at locations where there is a change in magnet width, and it is corrected to advance actual sensor output if the width of the magnet sensed earlier by the rotation angle sensor is wider and to delay actual sensor output if the width of the magnet sensed earlier is narrower. As a result, the sensor output takes an ideal waveform free of error.

Other features and advantages of the present invention will be apparent from the following description of a preferred embodiment by referring to the accompanying drawings, in which like reference numerals designate the same or similar parts through the figures thereof.

DESCRIPTION OF THE PREFERRED EMBODIMENT

Figure 1:
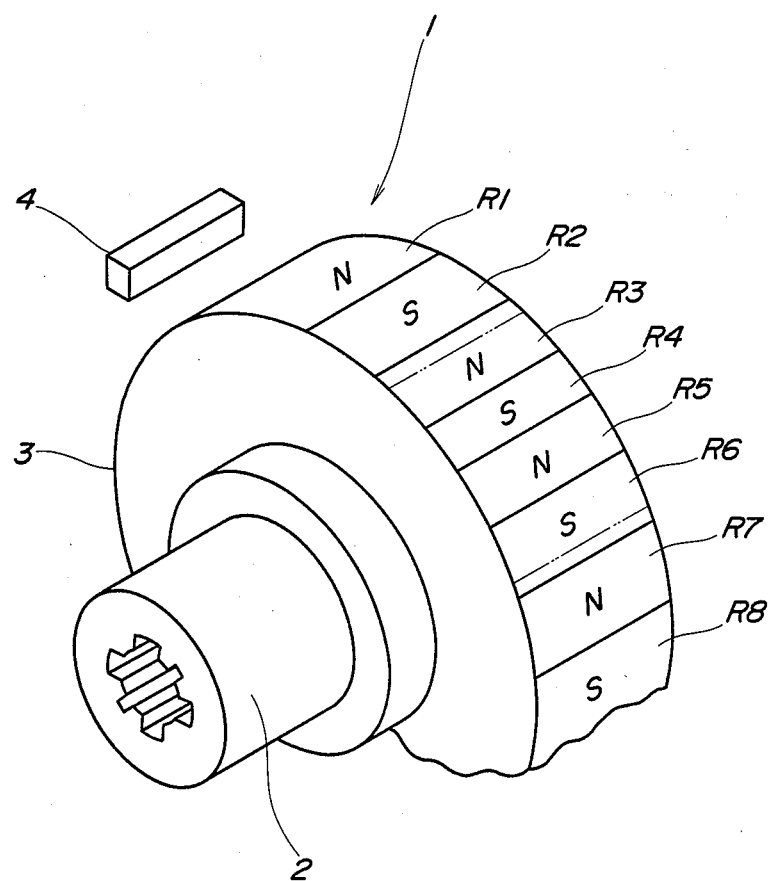
FIG. 1 is a partially fragmentary, perspective view illustrating a preferred embodiment of a rotation angle detector according to the present invention.
Figure 2:
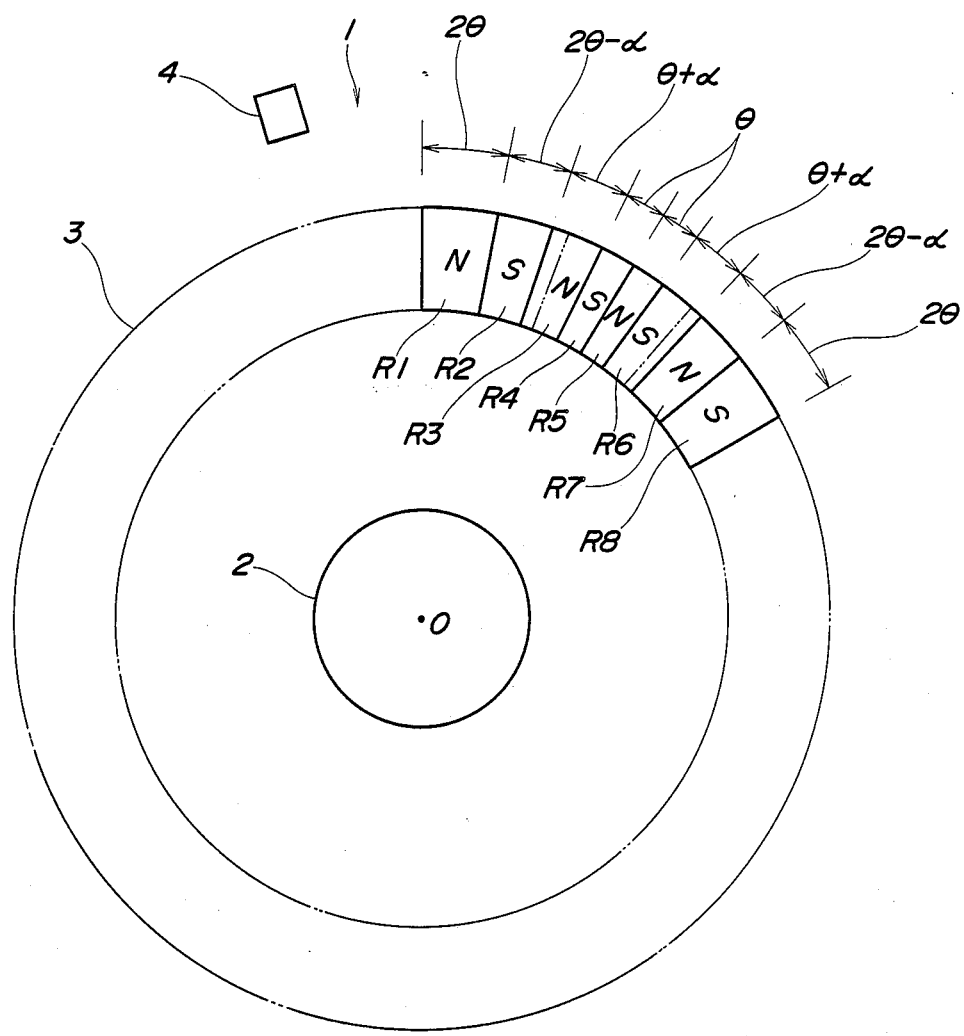
FIG. 2 is a front view schematically illustrating the arrangement of magnets in the detector of FIG. 1.
Figure 3:
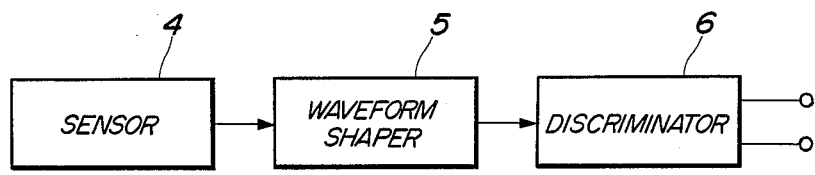
FIG. 3 is a block diagram of a circuit for processing output signals from a rotation angle sensory of the detector of FIG. 1.
Figure 5:
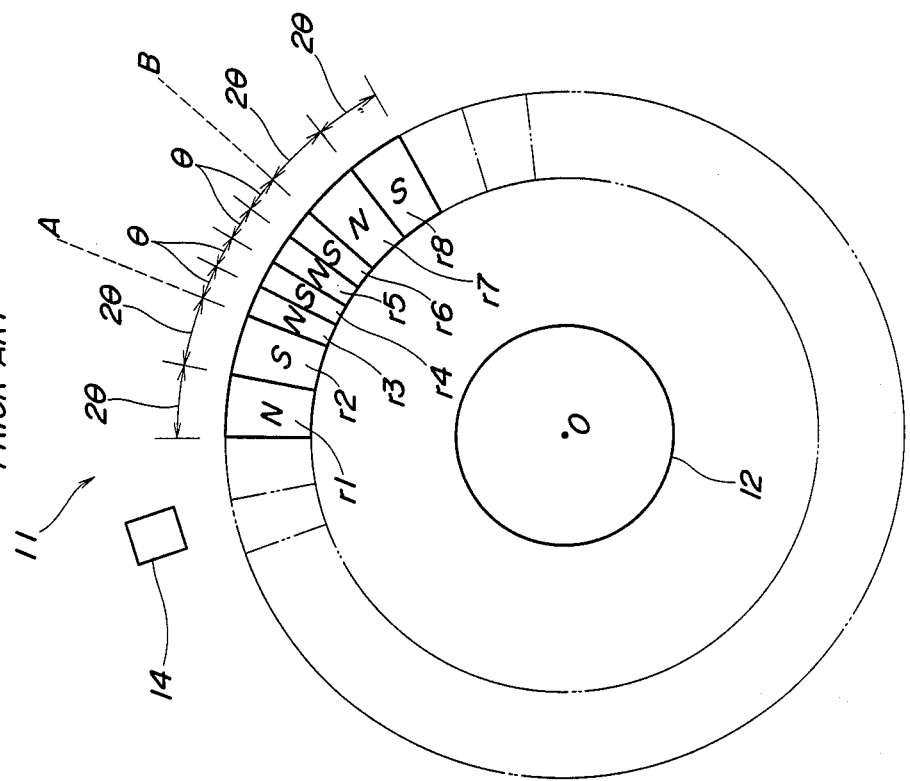
FIG. 5 is a front vie schematically illustrating the arrangement of magnets in the prior art detector of FIG. 4.
Figure 4:
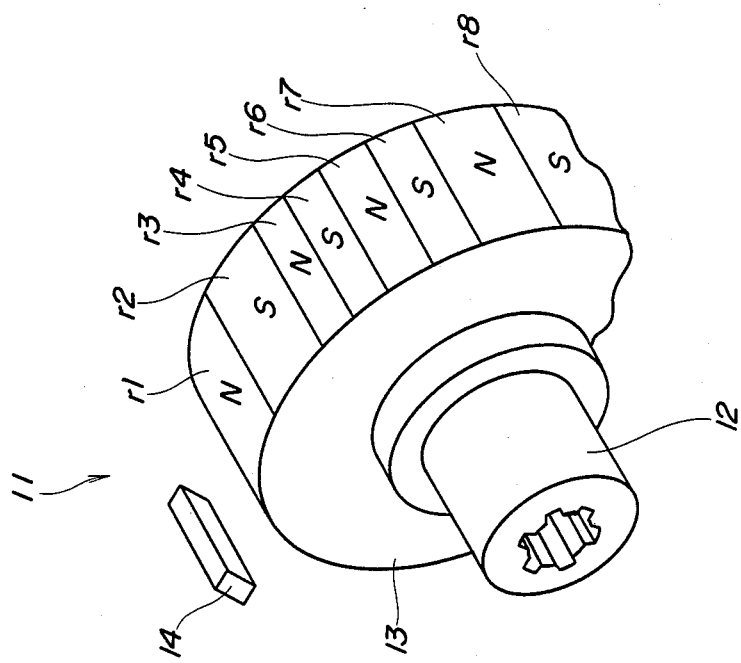
FIG. 4 is a perspective view illustrating a rotation angle detector according to the prior art.

FIGS. 1 through 3 illustrate a preferred embodiment of a rotation angle detector according to the present invention.

The inventive rotation angle detector indicated by reference numeral 1 has a rotary shaft 2 which is connected to, for example, the power side of an engine crankshaft or the like (not shown). The detector 1 further includes a cylindrical rotary body 3 integrally mounted on the rotary shaft 2, and magnets R1-R8 ... attached to the circumferential surface of the rotary body 3. The magnets R1, R3, R5, R7 ... are of N polarity, and the magnets R2, R4, R6 and R8 are of S polarity. As shown in FIGS. 1 and 2, these magnets are arranged in alternating N and S polarities along the direction of rotation of the rotary body 3. Arranged at a position spaced a predetermined distance from the circumferential surface of the rotary body 3 is a rotation angle sensor 4 for sensing the magnetic fields produced by the magnets R1 through R8. The magnets R1 through R8 disposed on the circumferential surface of the rotary body 3 are scanned by the rotation angle sensor 4 as the rotary body 3 rotates. The rotation angle sensor 4 comprises, for example, a Hall device, a magnetoresistance element and the like.

Among the magnets on the circumferential surface of the rotary body 3, the magnets R1, R2, R7 and R8 producing the rotation angle signals are formed to be comparatively wide, while the remaining magnets R3, R4, R5 and R6 producing the reference signals are formed to be narrower than the magnets R1, R2, R7 and R8. The magnet width refers to a length of the magnet in the circumferential direction of the rotary body 3 and is represented by an angle with respect to the center of rotation 0 of the rotary body 3.

As for the arrangement of the magnets R1 through R8 on the rotary body 3 in the example illustrated in FIGS. 1 and 2, the magnets R1, R2, R7 and R8 are originally allotted to equally divided portions ($2\theta$) of the circumferential surface and serve as sources of the rotation angle signals. On the other hand, the magnets R3 through R6 are allotted to half the area of the magnets R1, R2, R7 and R8 and serve as sources of the reference signals. In comparison with the prior art arrangement described above, there is no difference in that the widths of respective magnets R3 through R6 basically each covers an angle $\theta$ with respect to the center of rotation of rotary shaft 2, and the widths of the magnets R1, R2, R7 and R8 basically each covers an angle of $2\theta$. However, since a magnetic imbalance would occur at locations where the width changes from one magnet to the next, as at the boundary between the magnets R2 and R3 or between the magnets R6 and R7, compensatory measures are taken in accordance with the present invention. Specifically, in the illustrated embodiment, the rotary body 3 rotates in the counter-clockwise direction, and of the two magnets R2 and R3 of different widths, the magnet R2 is scanned earlier by the sensor 4. Also, the magnet R2 is wider than the magnet R3. Therefore, in accordance with the present invention, the width of the magnet R2 is made narrower by a predetermined angular amount ($\alpha$) than the former width ($2\theta$) and the width of the magnet R3 is made wider by a predetermined angular amount ($\alpha$) than the former width ($\theta$), without changing the sum of the areas of the magnets R2 and R3. As a result, the width of the magnet R2 is made ($2\theta - \alpha$), and the width of the magnet R3 is made ($\theta + \alpha$). It should be noted that the boundary line between the magnets R2 and R3 having the former widths is indicated by the phantom line in FIGS. 1 and 2. It will be appreciated that the sum of areas occupied by the magnets R2 and R3 on the circumferential surface of the rotary body 3 becomes $3\theta$.

Similarly, magnets R6 and R7 are of different widths, though the magnet R6 is scanned earlier by the sensor 4 and narrower than the magnet R7. In accordance with the present invention, therefore, the width of the magnet R6 is made wider by the predetermined angular amount ($\alpha$) than the former width ($\theta$) and the width of the magnet R7 is made narrower by the predetermined angular amount ($\alpha$) than the former width ($2\theta$), without changing the sum of the areas of the magnets R6 and R7. As a result, the width of the magnet R6 is made ($\theta + \alpha$), and the width of the magnet R7 is made ($2\theta - \alpha$). The boundary line between the magnets R6 and R7 having the former widths is indicated by the phantom line in FIGS. 1 and 2. It will be appreciated that the sum of areas occupied by the magnets R6 and R7 on the circumferential surface of the rotary body 3 becomes $3\theta$.

Figure 6:
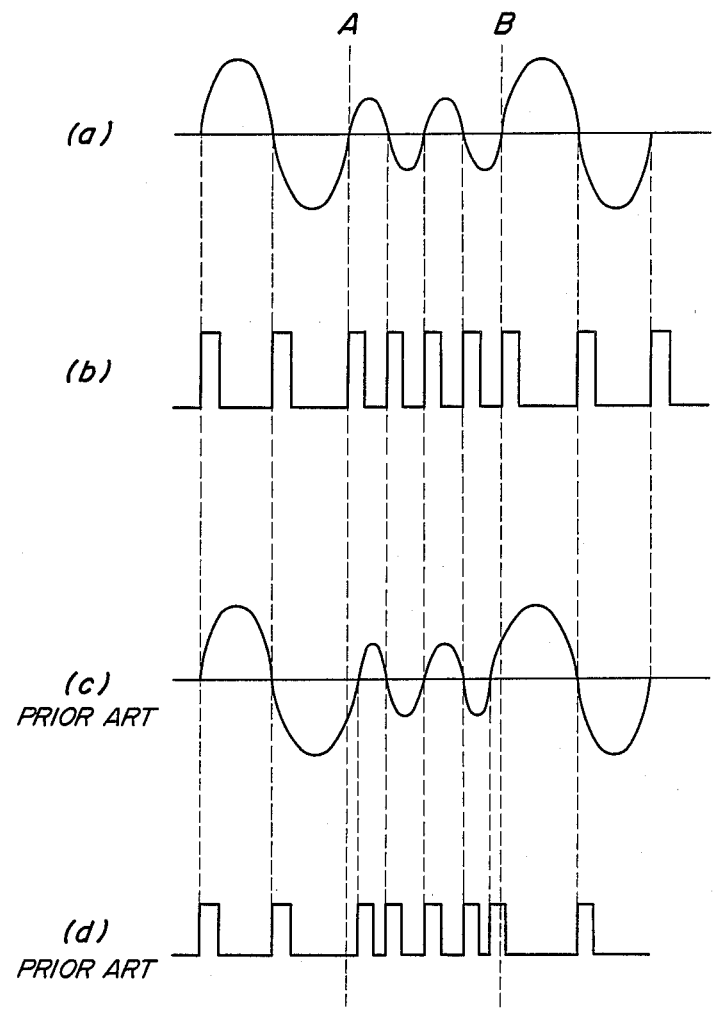
FIG. 6 is a time chart illustrating ideal sensor output, the ideal waveform of this output following shaping, sensor output in the prior art rotation angle detector, and the waveform of this output following shaping.

By thus adjusting the magnet width in the manner set forth above, the magnetic balance at the locations where there is a change in magnet width is corrected so that the output signal from the rotation angle sensor 4 will not involve and angular error. This makes it possible to obtain an ideal output waveform of the kind shown in FIG. 6(a).

In the illustrated embodiment, the widths of the magnets where there is a change in width are indicated by ($2\theta$) and ($\theta$) for the sake of convenience, and the magnet width is made either narrower or wider by the predetermined angular amount ($\alpha$) than the former magnet width. As a result of experiments, it is found that the width ($\theta$) of the magnet is preferably 5 degrees. Therefore, the width ($2\theta$) is preferably 10 degrees. As for the value of predetermined angular amount ($\alpha$), a range of from 0.5° to 1° is the optimum value, and the ratio between ($\theta$) and ($\alpha$) is preferably ($\alpha$)/($\theta$)=1/10−1/5.

The magnets R1 through R8 are scanned by the rotation angle sensor 4, the output of which contains both the reference and rotation angle signals. These output signals are shaped into a pulsed waveform by a waveform shaping circuit 5 shown in FIG. 3. The output waveform from the circuit 5 is of the type shown in FIG. 6(b). This output is applied to a discriminating circuit 6 which separates it into the reference signal and the rotation angle signal. These signals appear as separate outputs at the output terminals of the discriminating circuit 6.

The effect of the rotation angle detector of the present invention is as follows.

Specifically, both the rotation angle signal and the reference signal can be obtained by a single sensor, yet there is no magnetic imbalance at the locations where the magnet width changes from one magnet to the next. Accordingly, the rotation angle detector is capable of producing an output waveform devoid of angular error. Moreover, irrespective of the modification in width of the two mutually adjacent magnets whose widths differ, the sum of the areas of these two magnets is constant. This is significant in that the original ratio at which the magnets are allotted to the circumferential surface of the rotary body need not be changed, or in other words, in that the positions to which the magnets are assigned remain the same even though the widths of the magnets are changed. As a result, the change in the magnet width does not cause a phase shift in the output signal from the rotation angle sensor, thus enabling a highly precise rotation angle signal and reference signal to be obtained.

It should be understood that the present invention can be widely utilized to detect the angle of rotation of a rotating object and application thereof is not limited to detection of an angle of automotive engine crankshaft.

I claim:

1. A rotation angle detector for magnetically detecting a rotation angle of a rotatable object comprising:

a rotary body for rotating together with the rotatable object and having a circumferential surface;

a plurality of magnets arranged continuously on the circumferential surface of the rotary body, said plurality of magnets consisting of a plurality of first magnets each having a shorter length ($\theta$) in the circumferential direction of the rotary body, and a plurality of second magnets each having a longer length ($2\theta$) in the circumferential direction of the rotary body, said plurality of second magnets having the longer length ($2\theta$) are so arranged to sandwich said plurality of first magnets having the shorter length ($\theta$) in the circumferential direction, and all of said plurality of first and second magnets thus arranged on the circumferential surface of the rotary body having alternately different polarity;

a rotation angle sensor comprising a magnetically sensitive element arranged to oppose said plurality of magnets across a predetermined gap so as to scan said plurality of magnets when said rotary body rotates, and the first magnets having the shorter length ($\theta$) are scanned by the rotation angle sensor to obtain a reference signal and the second magnets having the longer length ($2\theta$) are scanned by the rotation angle sensor to obtain a rotation angle signal; and wherein at a portion on the circumferential surface where a second magnet having the longer length ($2\theta$) and a first magnet having the shorter length ($\theta$) are adjacent to each other, the length of the second magnet having the longer length ($2\theta$) is made shorter by a predetermined amount ($\alpha$) to have a length ($2\theta-\alpha$) and the first magnet having the shorter length is made longer by said predetermined amount ($\alpha$) to have a length ($\theta+\alpha$), and the relationship between ($\theta$) and ($\alpha$) is ($2\theta-\alpha$)>($\theta+\alpha$).

* * * * *